March 15, 1960     E. E. HOSEA ET AL     2,928,290
HYDRAULIC GEAR SHIFTING CONTROL
Filed Aug. 30, 1956     4 Sheets-Sheet 1
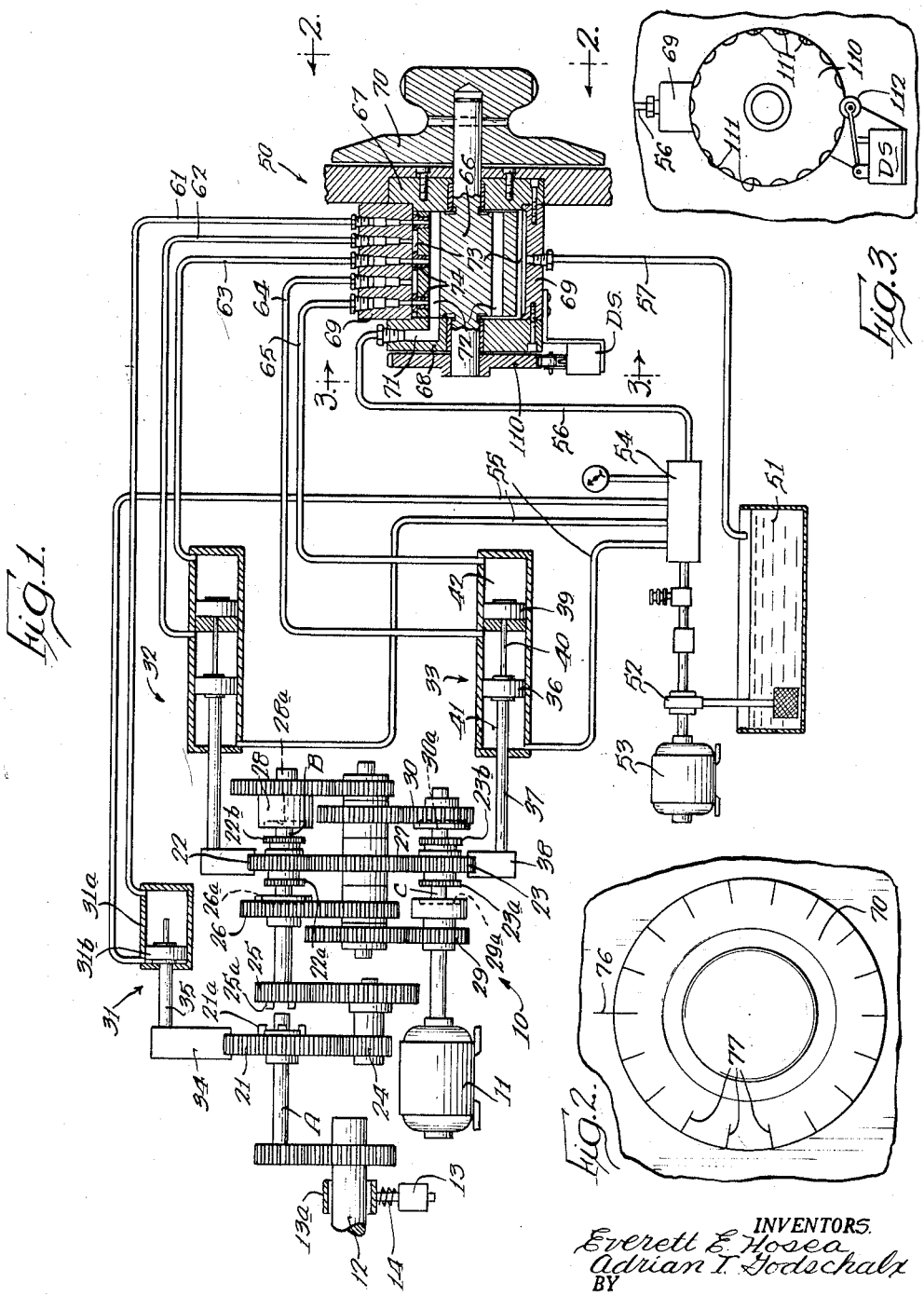
INVENTORS.
Everett E. Hosea
Adrian T. Godschalx
BY
Carlson, Pitzner, Hubbard & Wolfe
Attys.

INVENTORS.
Everett E. Hosea
Adrian T. Godschalx
BY
Carlson, Pitzner, Hubbard + Wolfe
Attys.

United States Patent Office 2,928,290
Patented Mar. 15, 1960

2,928,290

HYDRAULIC GEAR SHIFTING CONTROL

Everett E. Hosea, Kaukauna, and Adrian T. Godschalx, Appleton, Wis., assignors to Giddings & Lewis Machine Tool Company, Fond du Lac, Wis., a corporation of Wisconsin Application August 30, 1956, Serial No. 607,150

16 Claims. (Cl. 74—472)

The present invention relates to controls for assuring the smooth engagement of shiftable power transmission elements such as positive tooth clutches or the like. More particularly the invention relates to a control system for a hydraulically shiftable speed change mechanism that is especially useful in machine tools.

Multiple speed transmissions affording a wide range of gear ratios are often employed to transfer power from a prime mover to the spindles and feed screws of machine tools. It is desirable, for example, to drive a spindle shaft of a horizontal boring and drilling machine from a constant speed motor through such a transmission. This arrangement provides a positive selectable drive for the spindle at any one of a wide variety of speeds, as may be required for boring or drilling different materials with cutters of various types and sizes.

It has further been proposed to utilize hydraulic systems to automatically shift the transmission elements into their various positional patterns so as to effect a change in the gearing ratio in response to setting a single hydraulic control dial. Since the spindle drive in a machine must be positive, any change of gear ratio in the transmission providing the driving force involves the uncoupling and meshing of positively interlocking clutch elements and gear teeth. These interlocking transmission parts are normally shifted axially along their respective shafts and unless they are properly and exactly alined, a hydraulic actuator can only urge the interfitting teeth into abutment. Thus, when rotation is resumed, the teeth "grind" and "clash."

It is the general aim of this invention to provide control means for a multiple speed, positively geared transmission that will automatically pulse, or intermittently actuate, the power source as an incident to changing the drive ratio of the transmission so that meshing gear teeth and clutch parts may properly mate and interlock without grind or clash.

It is, moreover, an object to provide control means of the above character that automatically stops and then pulses the power source as an incident to every adjustment of a control member which is positionable to cause the inter-engaging elements of the transmission to shift.

Another object is the provision of such control means that will pulse the prime mover incident to the energization of a power device which supplies energy to the shifting means, so that if the control member had been adjusted while the power device was shut down, the transmission elements will be properly meshed when energy is again supplied to the shifting means and the elements are shifted.

It is a more detailed object to provide a circuit of the above character which operates to pulse a power source that automatically times and limits the pulsing actuation to fixed predetermined intervals.

With greater particularity, it is an object to provide a control means of the above type which is especially simple and economical in its organization in that electrical time-delay relays are used to effect the pulsing operation.

In one of its aspects, it is an object of the invention to aid in settling shiftable gears and clutch parts into proper engagement by exerting a counter torque on the transmission by means of an automatically actuated brake.

With more particularity, it is an object to provide control means for pulsing the power source and actuating the counter-torque brake which assures that the brake will be off each time the motor is pulsed by actuating the brake only for a predetermined limited time immediately following each pulse of the power source.

Other objects and advantages of the invention will become apparent upon reading the attached detailed description and upon reference to the drawings in which:

Figure 1 is a schematic view of an exemplary multiple ratio transmission having an hydraulically actuated gear shifting system with which the controls of the present invention may be used.

Fig. 2 is a front view of the face of the hydraulic control dial shown in Fig. 1 and is taken along line 2—2 in that figure.

Fig. 3 is an end view of the control circuit initiating switch and its actuating means taken along line 3—3 in Fig. 1.

Figure 4:
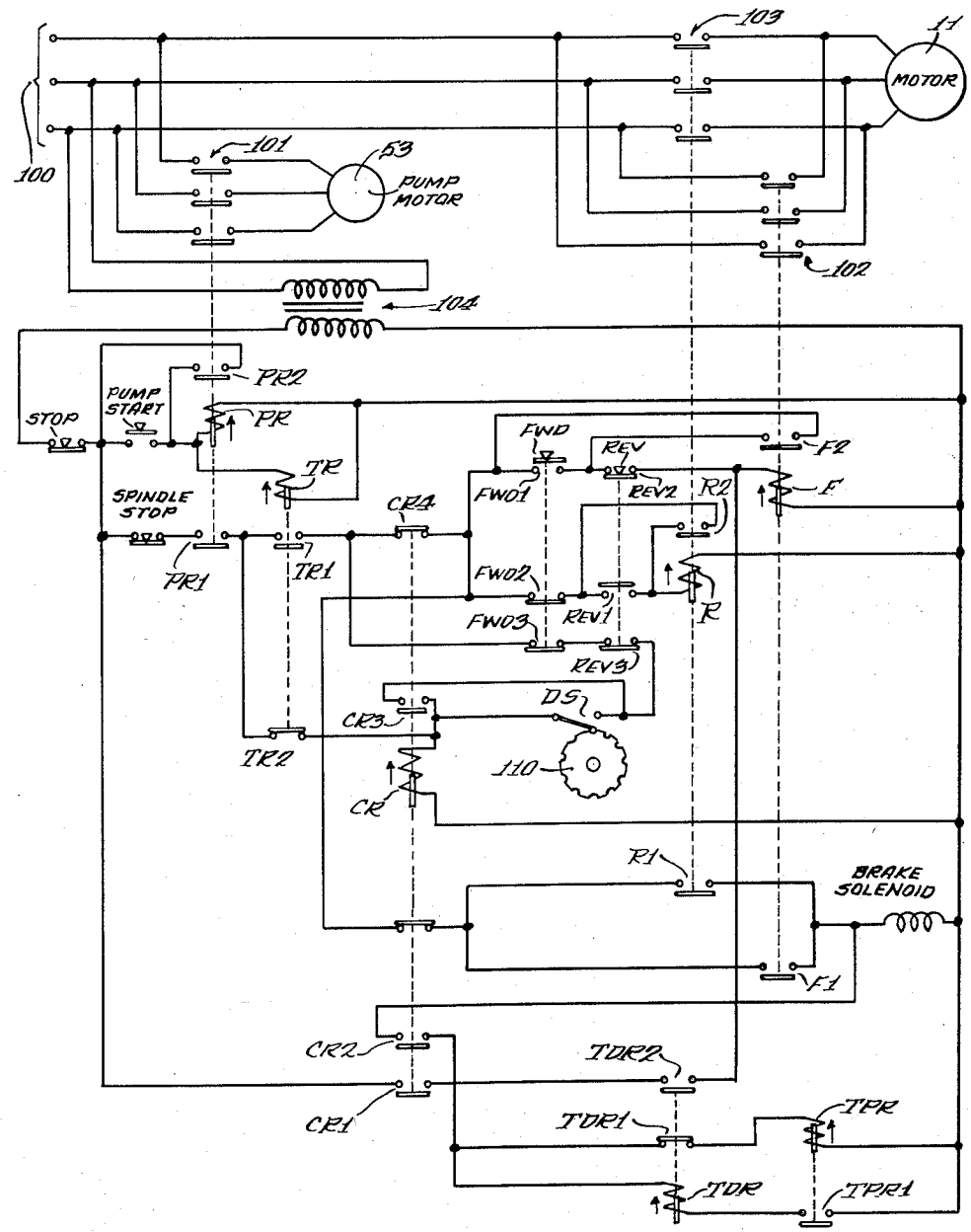
Fig. 4 is a schematic wiring diagram of a control circuit embodying the features of the present invention.

While the invention will be described in connection with preferred embodiments, it will be understood that we do not intend to limit the invention to those embodiments but, on the contrary, intend to cover such modifications, equivalents, embodiments and constructions as may be included within the spirit and scope of invention as defined in the appended claims.

The exemplary transmission

Turning first to Fig. 1, there is shown a transmission 10 of a type particularly useful in machine tools. Driving the transmission 10 is an electric motor 11 and the transmission is shown supplying rotating power to an output shaft 12 which, in the present instance, is the spindle of a milling and boring machine. In order to change the gearing ratio of the transmission 10, three shiftable elements 21, 22, 23 are provided which are splined to their respective supporting shafts A, B and C. The remaining gears in the transmission are fixed to the shafts on which they are carried. Shiftable element 21 has two effective positions. It may engage gear 24 as illustrated, or be shifted toward the right in Fig. 1 so that clutch elements 21a engage the clutch elements 25a formed as part of gear 25. Shiftable elements 22 and 23 each have three effective positions. Element 22 may be shifted toward the left in Fig. 1 to engage its clutch elements 22a with the clutch elements on 26a of gear 26, or it may occupy a mid-point and engage gear 27, or it may be shifted toward the right and engage its clutch parts 22b with the clutch parts 28a of gear 28. Shiftable element 23 may engage gear 27, as illustrated, or may be shifted toward the left so that its clutch elements 23a engage the clutch elements 29a of gear 29, or to the right for engaging its clutch parts 23b to the clutch elements 30a of gear 30. It will be apparent that, due to the relative gear sizes in the transmission, each time one of the shiftable elements 21, 22, 23 is moved to one of its alternative positions of engagement the gearing ratio of the transmission is changed. Since element 21 has two positions and elements 22 and 23 have three positions each, it can be seen that a total of eighteen different gearing ratios has been provided. Thus, the positional pattern of the three shiftable elements 21, 22, 23 determines the speed at which the spindle shaft 12 is driven by the motor 11.

For the purpose of holding the spindle shaft 12 against idle rotation, a brake 13 having a brake shoe 13a is provided as diagrammatically illustrated in Fig. 1. To control the application of the brake 13, a brake solenoid is utilized, the arrangement being such that the solenoid must be energized to hold the brake 13 in its non-effective position. When the brake solenoid is de-energized, the brake is applied to the shaft 12 by biasing means such as a spring 14.

*The hydraulic actuators*

For the purpose of shifting the movable elements 21, 22, 23 to any one of their eighteen positional patterns and thereby selecting the desired one of the eighteen drive ratios, three differential pressure hydraulic actuators 31, 32 and 33 respectively are provided. Actuator 31 comprises a single cylinder 31a and a piston 31b, the latter being movable between two positions and connected to shift the gear-clutch element 21 to either of two corresponding positions. In the preferred embodiment the fluid at the left of the piston 31b is constantly maintained at the pressure level of the hydraulic system. When it is desired to urge the piston toward the left and thereby move element 21 by means of a shifter 34 to the position illustrated, fluid at the constant pressure level of the system is introduced at the right of the piston. This results in fluid at equal pressure on each side of the piston, but, due to the area displaced by the piston rod 35, a greater force is exerted on the right of the piston urging it toward the left. To return the piston to the right, and thus move element 21 to its second position, the cylinder chamber on the right of the piston 31b is vented and the constant pressure on the opposite side of the piston urges it toward the right.

Actuators 32, 33 are of a three-position cascaded type and are substantially identical so that only actuator 33 will be described in detail. The actuator 33 has a primary piston 36 fixed to a control rod 37 which moves the shifter 38. Separate from this assembly is a secondary piston 39 fixed to an actuating rod 40. The pistons 36 and 39 slide in two separate cylinder chambers 41, 42 respectively. The fluid at the left of primary piston 36 is maintained at the uniform pressure level of the system. To move the shifter 38, and engage element 23 with gear 30, the fluid pressure is relieved at the right of primary piston 36 and in chamber 41 and at the right of the piston 39 in the chamber 42. Thus, the constant fluid pressure at the left of primary piston 36 will urge the pistons 36, 39 toward the right and control rod 37 will move shifter 38 in that direction.

To position shifter 38 in its middle position, thereby causing element 23 to engage gear 27, fluid at the pressure of the hydraulic system is introduced into chamber 42. As was discussed above in connection with actuator 31, this will produce a greater force toward the left on secondary piston 39 than is exerted on the left side of primary piston 36 due to the area occupied by control rod 37. When this is done, the pressure on secondary piston 39 will urge the piston as far to the left as it may go, and the pressure at the left of primary piston 36 will maintain the pistons in the positions illustrated.

To urge the shifter 38 to its extreme left position, fluid at the pressure level of the hydraulic system is introduced at the right of primary piston 36 in the chamber 41. Since actuator rod 40 is substantially smaller than control rod 37, a greater force will then be exerted on the right of primary piston 36 than on the left. Thus, the primary piston 36 will simply pull away from the actuator rod 40 and move to the left of the chamber 41, causing control rod 37 and shifter 38 to urge element 23 into engagement with gear 29. As indicated above, the operation of actuator 32 is identical to that of the actuator 33.

*The hydraulic actuator controls*

Also shown in Fig. 1 in somewhat schematic form is a hydraulic control circuit to selectively apply or relieve fluid pressure at the actuators 31, 32, 33. In general the system comprises a selector valve 50, a fluid reservoir tank 51, a power device for shifting here shown as a fluid pump 52 driven by an electric motor 53, and a manifold 54 connected to the output of the pump 52 for distributing fluid under pressure through various conduits. Advantageously, the fluid in the reservoir may be oil, and the pump 52 may also be connected to supply the oil to a lubricating system (not shown) for the transmission 10. To maintain fluid under pressure at the left of the primary pistons in each of the actuators 31–33, conduits 55 lead directly from the manifold 54. To selectively supply fluid pressure at the right of the various primary pistons and to the secondary pistons of actuators 32, 33, a conduit 56 leads from the manifold 54 to the selector valve 50, which in turn directs the fluid under pressure to selected ones of the conduits 61–65. To relieve the fluid pressure on the right-hand sides of the various pistons, the valve 50 connects selected ones of the conduits 61–65 to a return conduit 57, which empties back into the reservoir 51.

Considering the selector valve 50 in more detail, it comprises a movable control member or cylindrical valving drum 66 journaled in spaced housing members 67, 78. Closely surrounding the drum 66 is an annular casing 69 sealed at each end to the housing members 67, 68 respectively. The members 67, 68, 69 therefore form a sealed cylindrical chamber in which drum 66 is free to rotate. In order to rotate the drum 66 to any desired angular position, a dial 70 is fixed to a stub shaft formed as an integral part of drum 66 and which extends through housing member 67. The face of dial 70 which can be readily seen in Fig. 2, carries a series of circumferentially spaced indicia 77, which in the present instance are 18 in number. These indicia 77 are intended to register with an index mark 76 carried on the frame of the machine. By alining any selected one of the indicia 77 with the index mark 76, the dial 70 and the drum 66 to which it is fixed are positioned to a corresponding one of 18 regular positions.

In each of the designated angular positions of drum 66, in this case 18 in number, one of a series of circumferentially spaced axial openings 72 in the drum becomes registered with a pressure inlet passage 71 communicating with the conduit 56. Thus, it can be seen that fluid under pressure can be introduced to any one of the eighteen openings 72 by positioning dial 70 and causing the selected opening to register with the passage 71.

It should be noted at this point that while there is fluid under pressure in the particular opening 72 that has been alined with passage 71, the annular space 73 formed between the outer surface of drum 66 and the inner cylindrical surface of member 69 is connected to the reservoir 51 via the return conduit 57 at the bottom of the valve 50. Thus, by connecting different combinations of the conduits 61–65 to a pressure filled opening 72 or to the fluid return space 73, any desired pattern of movement can be given the actuators 31–33.

So that the conduits 61–65 may be connected to either the source of the pressure or the fluid reservoir, a series of radial holes are drilled through the member 69 and one of the conduits 61–65 is sealed at the end of each hole. As can be seen in Fig. 1, these spaced holes provide an access passage from the conduit 61–65 to the fluid return space 73.

For the purpose of connecting selected ones of the conduit 61–65 to the fluid under pressure in an opening 72, different combinations of axially spaced annular buttons 74 are provided to communicate with the respective openings 72 and aline with different combinations of the radial holes in the casing 69. In the interest of simplicity, only those buttons appearing at the top of drum 66 are illustrated in Fig. 1. The buttons 74 are fitted into the periphery of drum 66 and their outer surfaces slide in sealing engagement on the interior of the annular casing 69. Extending through the center of the buttons are passages which become alined with the holes in member 69 leading to the conduits 61–65. When a button 74 is brought into alinement with a hole in member 69, the fluid under pressure is free to flow through conduit 56, passage 71, opening 72, and through the button 74 to the particular one of the conduits 61–65 that is alined therewith.

In each of the angular positions of drum 66, the positioning of one or more buttons 74 determines which of the conduits 61–65 will be connected to the source of fluid pressure and which of those conduits will be open to the reservoir 51. In this way, each angular position of drum 66 can be made to produce a different positional pattern for the actuators 31–33, and through these actuators, a different drive ratio in the transmission 10 is determined by the corresponding positional pattern of the shiftable elements 21, 22 and 23. Thus, in the illustrated system, simply by positioning dial 70 to any one of its eighteen angular positions, the transmission 10 may be set to produce a corresponding one of its eighteen possible drive ratios.

*The control system in general*

Figure 5:
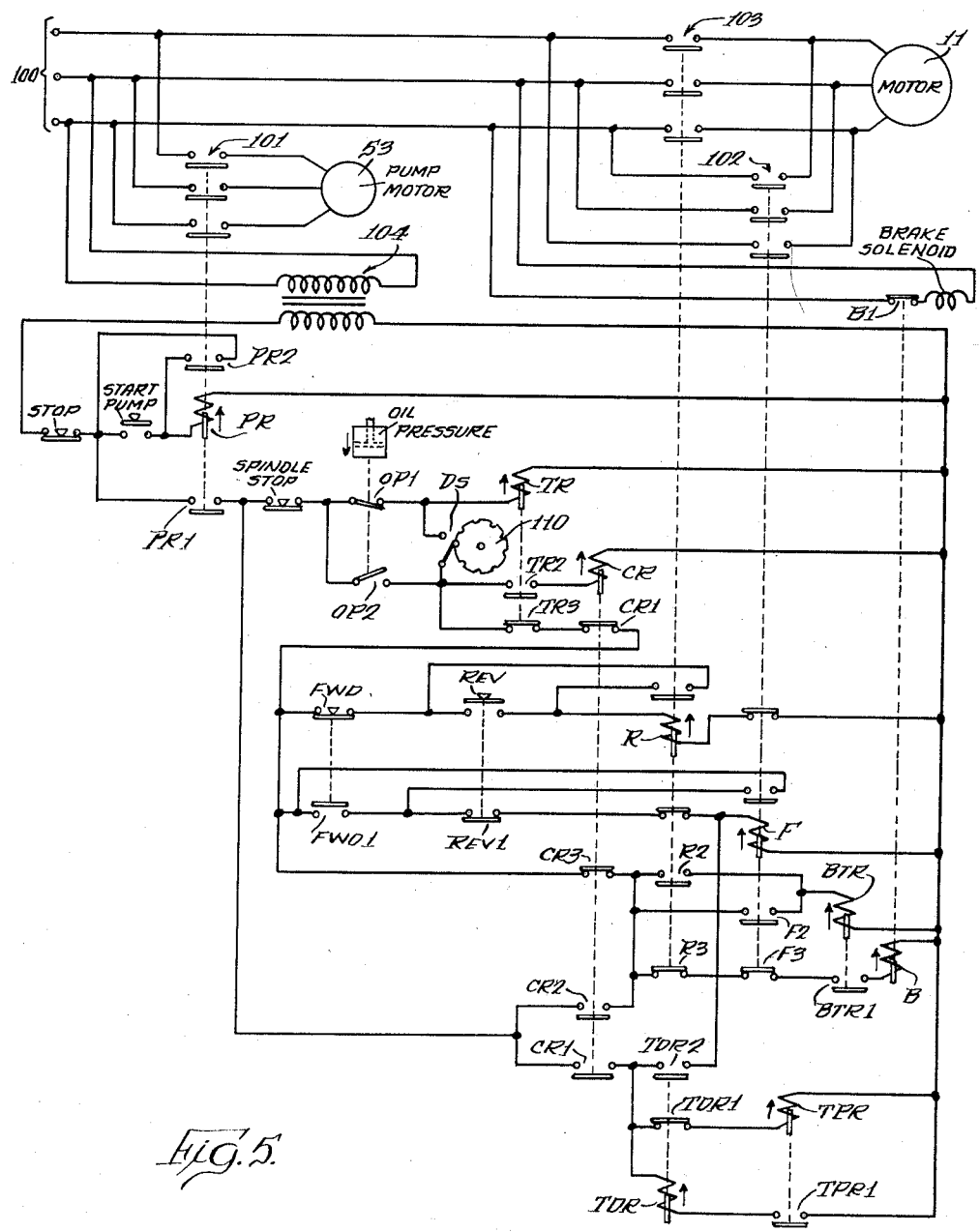
Figs. 5 and 6 are modified schematic wiring diagrams of second and third embodiments of the invention.
Figure 6:
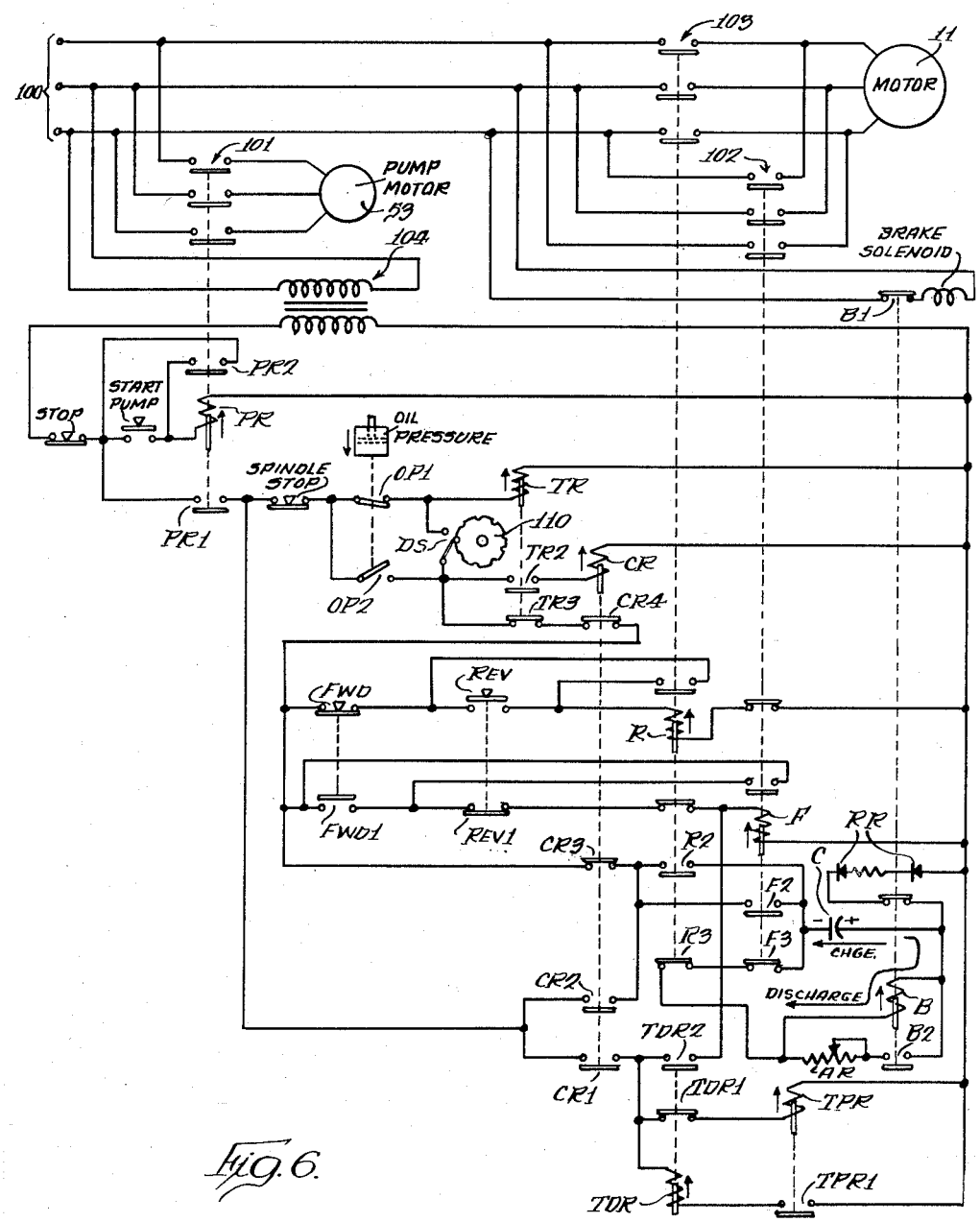

Turning now to Figs. 4, 5 and 6, there is shown three embodiments of the control system of the present invention. As shown therein, the spindle driving motor 11, and the hydraulic fluid pump motor 53, are adapted to be energized from a suitable voltage source 100. The motor 11 is wired for both forward and reverse operation. Controlling the supply of power to pump 53 is a relay operated switch 101. Controlling the application of power to the windings of motor 11 for either forward and reverse operation are switches 102 and 103 respectively. Power for the control circuit is also drawn from source 100 through a suitable transformer 104.

*The first embodiment*

In order to prevent the motor 11 from operating before there is fluid pressure in the hydraulic system to effect shifting of the elements 21–23 and to lubricate the transmission 10, an interlock is provided between the pump control and motor control circuits. To start the pump motor 53, and thus condition the remaining circuit for operation of the spindle motor 11, the Pump Start button is momentarily pressed by the operator. This energizes a relay PR which picks up, closing the pump motor switch 101 and interlock contacts PR1. A suitable holding circuit including contacts PR2 is provided to lock-in relay PR once it is actuated. To stop the pump, a Stop button is pressed which drops out relay PR, breaking the holding circuit and opening switches 101 and PR1.

Pressing the Pump Start button also energizes a time delay relay TR, to which later detailed reference will be made. It will suffice at this point to observe that picking up relay TR closes contacts TR1 and conditions a primary, or first, motor control circuit for operation.

The operation of forward and reverse switches 102, 103 for spindle motor 11 is under the control of relays F and R, respectively. To actuate relays F and R, push button switches FWD and REV are provided. For example, pressing button FWD momentarily closes contacts FWD1, thereby energizing relay F, which picks up and seals in through contacts F2, and at the same time closes switch 102. To drive the motor 11 in a reverse direction, push button switch REV controls a relay R through contacts REV1 in a similar manner. To insure that both relays F and R cannot be simultaneously actuated, the forward and reverse buttons have normally closed second sets of contacts FWD2 and REV2, respectively, arranged so that relay F cannot be energized when the button REV is pressed and vice versa. If the reverse switch REV is pressed while the motor 11 is running in a forward direction, the contacts REV2 will open to drop out relay F, after which relay R will pick up so that the switches 103 reversely energize the motor. To stop the operation of the machine, both a Stop button and a Spindle Stop button are provided. The Stop button is positioned in the circuit so that when it is momentarily actuated the supply of power to the entire control system is interrupted, and therefore any relays that were picked up and sealed in are de-energized and will drop out. Thus, by pressing the Stop button, relay PR drops out, stopping the pump motor, and whichever relay, F or R, that was picked up to operate motor 11 is also dropped out, to thereby de-energize and stop the spindle motor.

To stop the motor 11 without interrupting the operation of motor 53, the Spindle Stop button is provided. This button is located in the circuit so that only relays F or R are de-energized when the button is momentarily actuated, so that the motor 11 can be thereby stopped without de-energizing relay PR and stopping the pump motor 53.

In accordance with the present invention, the control system is provided with means to intermittently actuate, or pulse, the spindle motor 11 whenever the control member or dial 70 is moved to call for a change in the drive ratio of the transmission 10. The effect of the intermittent actuation of motor 11 is to cause the various shiftable parts of the transmission that are being axially urged to a new position to intermittently rotate relative to the parts toward which they are being urged. Thus, if the clutch or gear teeth on the two parts are alined and tend to abut rather than slip into mating engagement, the intermittent stepping of the transmission shifts the clutch parts until they settle in their proper mating positions under the urging of the hydraulic actuators.

The pulsing means in the present embodiment comprises a second motor control circuit which includes two time delay relays TDR and TPR. When this second motor control circuit is energized, as by closing contacts CR1 to which later detailed reference will be made, relay TPR is energized. This relay is of the time delayed pick-up variety, i.e., it causes a predetermined time interval from the instant the coil is energized to lapse before picking up. At the expiration of this time interval, this relay picks up and contacts TPR1 are closed, energizing the coil of the relay TDR. This relay is also a time delay relay but of the time delayed, drop-out variety, i.e., once de-energized, a predetermined time interval must pass before the relay drops out.

When contacts TPR1 are closed, relay TDR immediately picks up to open contacts TDR1 and close contacts TDR2. Closing contacts TDR2, energizes relay F and drives the motor 11 in a forward direction. Opening of contacts TDR1 de-energizes relay TPR, which immediately drops out, thus breaking contacts TPR1. Breaking the latter contacts de-energizes relay TDR, but being of the time-delayed, drop-out type, the relay remains picked up for a fixed time interval and the contacts TDR2 remain closed during that interval, continuing to drive motor 11. When the relay TDR does drop out, relay F is de-energized, thereby stopping motor 11, and contacts TDR1 are closed to again energize relay TPR and the cycle is repeated.

Thus, is can be seen that the relays TPR and TDR operate in a flip-flop fashion with their delayed operating characteristics serving to control the rate at which the flip-flopping takes place. Each time relay TDR is energized, and during the brief period of its delayed drop-out, the relay F is energized. Thus, the motor 11 is intermittently energized or pulsed to rotatively step the transmission 10 until all the shiftable elements are meshed. The time intervals in which the operation of the relays TDR and TPR are delayed, may be, for example on the order of two or three seconds and, therefore, the pulsing circuit will cause the motor to alternately start and stop every two or three seconds.

In keeping with the present invention, means are provided to energize the pulsing circuit of the control system each time the dial 70 is turned to condition the hydraulic actuators 31–33 for changing the transmission drive ratio. In the present embodiment, this means includes a control relay CR, which is energized each time dial 70 is rotated. In order to energize relay CR when dial 70 is adjusted, a dial microswitch DS (Figs. 1 and 3) is positioned to be closed by a cam disc 110 each time the dial 70 is adjusted. The cam disc 110 is fixed to the drum 66 by being mounted on a stub shaft that extends through the housing member 68. Thus, it can be seen that as dial 70 is turned to adjust the position of drum 66, the cam disc 110 is also rotated. In order to actuate the microswitch DS, cam disc 110 has a scalloped periphery formed by a series of rounded depressions 111, each depression being angularly positioned to correspond to one setting of dial 70. Cooperating with the scalloped peripheral edge of cam disc 110 is a pivotably mounted roller 112 which is spring-urged into engagement with the disc. The arm upon which roller 112 is mounted engages the actuating button of the microswitch DS, the arrangement being such that the microswitch DS is not actuated when the roller 112 is seated in a depression 111. However, when the disc 110 rotates to a new angular position, the roller 112 is cammed outwardly to the periphery of the disc and thus closes the microswitch.

Turning again to Fig. 4, it can be seen that closing switch DS energizes relay CR if contacts PR1 and TR1 are at that time closed. It will be remembered that these latter contacts close when the pump motor 53 is first started and remain closed during the operation of the machine. The energization of control relay CR causes it to pick up and seal in through its contacts CR3. The picked-up relay CR breaks the motor control circuit by opening contact CR4, thus de-energizing the relay F or R and stopping the continuous operation of motor 11, and closes contacts CR1, thus energizing the motor-pulsing relays TDR and TPR described above.

To briefly summarize the operation of the control system, as thus far described, it will be recalled that the hydraulic pump motor 53 must first be started before the machine is to be operated. To accomplish this, the Pump Start button is closed, energizing and locking in relays PR and TR. This closes switch 101, starting motor 53, and also closes contacts PR1 and TR1, thereby conditioning the motor control circuit for operation. The operator then may press either button FWD or REV in order to start the motor 11 in a forward or reverse direction respectively. These spring-urged buttons momentarily close either the contacts FWD1 or REV1, depending on which is pressed, thereby energizing and locking in the associated relay F or R, respectively. The picking up of either relay F or R closes either the switch 102 or 103, thereby energizing motor 11 for rotation in either a forward or reverse direction.

The machine then being in operation, in order to change the rotative speed of spindle shaft 12 the operator need only adjust dial 70 to a new setting. Adjusting dial 70 turns cam disc 110 and immediately closes microswitch DS, thereby energizing control relay CR which picks up and locks in. Relay CR opens contact CR4, thus de-energizing the motor control circuit and causing the energized relay F or R to drop out, stopping the motor 11. The energization of control relay CR also closes contacts CR1, thus energizing the pulsing circuit. Relay TPR is immediately energized but delays in picking up, thereby allowing the motor 11 to slow down and stop. When relay TPR does pick up to close contacts TPR1, the relay TDR is energized and immediately picks up to close contacts TDR2, thereby energizing relay F and causing the motor to be driven in a forward direction. The relays TDR and TPR continue to switch in the manner described above and the motor 11 therefore continues to be driven in intermittent pulses.

During this pulsing operation, the turning of dial 70 has repositioned the drum 66 causing hydraulic fluid under pressure to flow in a different pattern to the hydraulic actuators 31–33. One or more of these actuators are therefore urging, during the motor pulsations, one or more of the slidable transmission elements 21–23 to a new position. If the sliding elements of the transmission do not at first mesh into their new inter-engaging positions, the pulsing motor 11 steps the transmission parts in small angular increments so that the sliding elements may quickly and properly inter-engage and mate. As the transmission is being shifted, the operator may watch the spindle shaft 12 and when he notes that it is rotating with small pulsing movement, he knows that the transmission elements are properly engaged in their new positional pattern. To stop the pulsing action and resume normal operation of the motor 11, the operator then merely presses either of the buttons FWD or REV depending upon the direction he wishes the motor 11 to rotate. Pressing one of these buttons opens either the contacts FWD3 or REV3 and de-energizes the control relay CR which drops out, simultaneously closing contacts CR4, thus permitting normal operation of the first motor control circuit, and opening contacts CR1, thus de-energizing the pulsing circuit.

It can be seen then that each time the gears are shifted in the transmission 10 by adjusting the dial 70 to a new angular position, the motor 11 is automatically stopped and made to operate in intermittent pulses until either the forward or reverse motor control buttons FWD, REV are again pushed to resume normal operation of the machine.

Reference will now be made to the function of the relay TR. It will be appreciated that when the machine is shut down and the pump motor 53 idle, the dial 70 may be turned to a new angular position. This, of course, changes the paths of flow for the hydraulic fluid, but since the machine is not in operation, there is no fluid pressure and the actuators are not shifted. Thus, the hydraulic system is poised to change the gearing ratio in the transmission as soon as the pump motor 53 is turned on to restore fluid pressure. If the pump motor 53 and the spindle motor 11 were both started into normal operation, the shifting transmission element would very likely "clash" and "grind."

In keeping with the invention, means are provided to pulse the motor 11 for a predetermined interval each time the pump motor 53 is started. In this way, if the hydraulic system is poised to shift gears, the shift can be accomplished during a normal pulsing operation after the pump motor 53 is started, to thereby avoid gear clash and grind. In the present embodiment, as was previously pointed out, pressing the Pump Start button energizes relay PR which picks up and locks in to start the hydraulic pump motor 53. Pressing the Pump Start button also energizes relay TR, but this relay is of the time delayed pick-up type and, therefore, does not pick up until the passage of a predetermined time interval. During this interval the contacts TR2 remain closed and control relay CR is thus energized. As set forth above, energization of relay CR closes contacts CR1 and results in the pulsing operation of the motor 11. After the predetermined time delay, relay TR picks up, opening contacts TR2 to de-energize relay CR and stop the pulsing operation, and closing contact TR1, to thereby condition the main motor control circuit for normal operation of the machine in response to actuation of the FWD or REV push buttons.

To briefly summarize then, it can be seen that each time the Pump Start button is pressed, the pump motor 53 is immediately started and the control relay CR is energized for an interval required for time delay TR to pick up. This interval is on the order of 10 to 20 seconds and, therefore, during this period the motor 11 is pulsed a number of times to allow the hydraulic actuating system to settle in whatever pattern has been determined by the prior setting of dial 70. Following the expiration of this time interval, the relay TR picks up, conditioning the motor control circuit for normal operation, as was previously described.

Attention will now be directed to the brake circuit shown in Fig. 4. As was described above, the spindle brake 13 is released when the brake solenoid is energized. To assure that the brake 13 is not on when the motor is running in either a forward or reverse direction, the motor control relays F and R operate contacts F1 and R1, respectively. Thus, when relay F is picked up to energize the motor for rotation in a forward direction, the contacts F1 close, energizing the brake solenoid and releasing the brake. The contacts R1 perform the same function when the relay R is energized.

According to one of the features of the invention, means are provided to insure that the brake remains ineffective during the pulsing of motor 11. It will be noted that when the control relay CR is picked up to initiate the pulsing operation of motor 11, contacts CR2 as well as contacts CR1 are closed. These contacts energize the brake solenoid and keep the brake ineffective so long as the pulsing operation continues.

The second embodiment

In the form illustrated by Fig. 5, elements performing the functions corresponding to elements in Fig. 4 have been identified by the same reference characters.

Since it is desirable, for the reason referred to above, to energize the pump motor 53 before the machine is operated, an interlock is provided to prevent actuation of motor 11 until the pump motor 53 is in operation. To start the pump, the Start Pump button is pressed, thus energizing relay PR which picks up and locks in. Relay PR closes switch 101, thereby starting the pump 53, and closes contacts PR1 to condition the control system for motor 11 for operation.

Turning to the primary, or first, motor control circuit, it can be noted that it is identical to that described above in connection with the Fig. 4 modification. When the circuit is conditioned for operation, the operator may press either of the spring-urged buttons FWD or REV to energize either the relays F or R, respectively. The energization of relay F causes it to pick up and close switch 102, thereby driving motor 11 in a forward direction. Energization of relay R closes switch 103 and drives the motor 11 in a reverse direction. The buttons FWD and REV have contacts RWD1 and REV1 for preventing the simultaneous actuation of both relays F and R, as was hereinbefore described.

The pulsing circuit in this embodiment is identical to that previously described in that it includes a time delayed pick-up relay TPR and a time delayed drop-out relay TDR connected in parallel and electrically interlocked so that when the circuit is energized, the contacts TDR2 are intermittently closed to intermittently actuate relay F and thereby pulse motor 11.

Reference will now be made to the means in this embodiment for energizing the pulsing circuit each time the dial 70 is repositioned to bring about a change in the transmission gearing ratio. As described above, turning dial 70 rotates cam disc 110, which closes microswitch DS. It can be seen that when contacts OP2 are closed, the actuation of switch DS causes time delay relay TR to be energized. The contacts OP2 will be more fully described below and it suffices to point out here that during normal machine operation these contacts remain closed. The time delay relay TR is of the time delayed, drop-out type and when energized, immediately picks up to close contacts TR2 and open contacts TR3. The opening of contacts TR3 breaks the first motor control circuit, causing the relay F or R, whichever is energized, to drop out and stop rotation of the motor. The closing of contacts TR2 energizes control relay CR, which immediately picks up. As in Fig. 4 modification, picking up relay CR closes contacts CR1, thereby energizing the pulsing circuit and the motor 11 begins its intermittent actuation.

As a feature of the invention in this embodiment, means are provided to automatically limit to a predetermined time interval the pulsing operation of motor 11. To this end, relay TR remains energized until dial 70 is positioned at its new setting, at which time the microswitch DS opens to de-energize the relay TR. This relay, being of the time-delayed, drop-out type, does not immediately drop out when de-energized but remains picked up for a determined time interval. This interval is preferably on the order of 15 to 20 seconds. During this time the control relay CR remains energized and, thus, the pulsing operation of motor 11 continues. At the end of this period the relay TR drops out, opening contacts TR2 to de-energize control relay CR and thereby stop the intermittent actuation of motor 11, and closing contacts TR3 which conditions the normal motor circuit for operation. The operator may then press either the forward or reverse buttons and resume the spindle drive at the newly selected speed.

Attention will now be directed to the oil pressure interlock which prevents normal operation of the motor 11 unless the hydraulic fluid pressure reaches a predetermined value. A fluid pressure responsive switch, diagrammatically illustrated in Fig. 5, is installed in the hydraulic system of the machine and controls contacts OP1 and OP2. When there is no hydraulic pressure, the switch OP1 is closed, energizing relay TR and switch OP2 is opened, de-energizing the normal control circuit. Thus, a lack of oil pressure prevents normal operation of motor 11 and causes the motor to be intermittently actuated.

Reference will now be made to the means for intermittently actuating motor 11 for a predetermined time interval each time the hydraulic pump 53 is started, the advantages of this operation having been set forth above. When the Start Pump button is pressed, the relay PR is picked up to start the pump motor 53 and the contacts PR1 are closed. Initially there is no oil pressure in the hydraulic system and the contacts OP1 remain closed. Therefore, closing contacts PR1 energizes relay TR. The energization of relay TR results in the pulsing actuation, for a predetermined time interval, of the motor 11 in the same manner as described above. As the pump motor 53 builds up the fluid pressure to a predetermined level, the switch OP1 opens, de-energizing relay TR. The contacts OP2 close, conditioning the primary control circuit for operation in response to actuation of the push button FWD or REV.

It can therefore be seen that by either pressing the Start Pump button, or by turning dial 70, the relay TR is energized and the motor is thereby pulsed for a predetermined time interval.

Turning attention next to the controls for brake 13, it will be noted that the power for energizing the brake solenoid in this modification is taken directly from the primary source of power 100. Since brake 13 is of the type that is ineffective when the brake solenoid is energized, it can be seen that the brake 13 is "off" when switch B1 is closed and is "on" when that switch is open.

In accordance with a further aspect of the invention means are provided to apply brake 13 to the spindle shaft 12 for a limited time following each pulsing movement of the motor 11. In this way the brake 13 will exert a counter torque on the transmission 10 each time it is applied. The alternate starting force of motor 11 and stopping force of brake 13 exerted on the transmission tends to quickly settle the shiftable, interengaging elements 21–23 into a new meshing relationship. In the present embodiment the means for energizing brake 13 following each intermittent pulsation of motor 11 comprises a brake relay B and a brake time delay relay BTR connected in parallel circuits. It will be recalled that each time the motor is pulsed, the relay F has been picked up and, therefore, contacts F2 are closed and contacts F3 are opened. Closing contacts F2 energize the brake time delay relay BTR. This relay is of the time delayed, drop-out type and, therefore, it immediately picks up upon energization and closes contacts BTR1. The closing of contacts BTR1 cannot immediately energize the relay B, since contacts F3 have been opened by relay F. At the end of the pulsing time interval, when contacts TDR2 are opened allowing relay F to drop out, the contacts F2 are opened and F3 are closed. Opening contacts F2 de-energizes brake timing relay BTR, but being of the delayed drop-out type, this relay remains picked up for a predetermined time interval. Thus, when contacts F3 close, the contacts BTR remain closed for a short time and the relay B is energized. Upon energization, relay B picks up opening contacts B1 to de-energize the brake solenoid and thereby apply brake 13 to the spindle shaft 12. At the end of the predetermined time interval, preferably one or two seconds, the relay BTR drops out, opening contacts BTR1 and de-energizing relay B, whereupon contacts B1 close energizing the brake solenoid and releasing brake 13. This cycle of operation is repeated each time the relay F is picked up and dropped out to pulse motor 11.

To briefly summarize the operation of the brake control circuit, it will be remembered that the pulsing circuit including relays TPR and TDR function to intermittently cause relay F to pick up and drop out, thereby pulsing motor 11. Each time relay F picks up, contacts F2 close, energizing relay BTR, which immediately picks up, closing contacts BTR1. When relay F drops out, opening contacts F2 and closing contacts F3, the relay BTR delay in dropping out one or two seconds. During this interval both contacts F3 and BTR1 are closed, energizing relay B which applies the brake 13. Thus each time a motor pulse is initiated, the brake is conditioned for operation and then each time the motor pulsation ends, the brake circuit is triggered to apply the brake a certain limited, predetermined time.

One of the further features of the invention is that the brake 13 is applied for a certain limited time interval whenever the Spindle Stop button is momentarily actuated to stop the operation of motor 11, so that the spindle shaft 12 is brought to a quick sure halt. It will be recalled that when the Spindle Stop button is pressed, the primary or first motor control circuit is broken and, if one of the relays F or R is locked in to drive the motor in either a forward or reverse direction, that relay is de-energized and will drop out. In the present embodiment, the means for applying the brake 13 when the Spindle Stop button is momentarily pressed to stop motor 11 comprises contacts R2, R3 and F2, F3, which are actuated by the relays R and F, respectively. As was pointed out above, when relay F is picked up to pulse motor 11, relay BTR is picked up and contacts BTR1 are closed. When relay F drops out, contacts F3 close and contacts BTR1 remain closed for a predetermined time interval so that relay B is energized and the brake applied until relay BTR finally drops out.

It will be apparent that this same brake operation will occur when relay F is picked up by pressing the button FWD and dropped out by pressing the Spindle Stop button, and it can be seen that the contacts R2 and R3, controlled by relay R, will operate the brake circuit in the same manner as contacts F2 and F3. That is, energizing either relay F or R, by pressing one of the buttons FWD or REV, respectively, will drive the motor 11 in either a forward or reverse direction. It also causes either contacts F2 or R2 to close, and closing either set will energize relay BTR. The relay BTR will remain picked up while the motor 11 runs, until the Spindle Stop button is pressed to drop out the relay F or R. When the relays F and R are de-energized, contacts R3, F3 and BTR1 are all closed, so that relay B is energized as soon as the Spindle Stop button is released following its momentary actuation, and thus break 13 is applied to bring the spindle shaft 12 to a quick halt. When the time delayed relay BTR drops out the brake 13 is again released.

In summary, it can be seen that each time the motor 11 is stopped by pressing the Spindle Stop button, the brake 13 is applied to assure a rapid smooth stop of the spindle shaft 12.

The third embodiment

The embodiment of the invention diagrammatically illustrated in Fig. 6 is substantially similar to that shown in Fig. 5 and similar reference characters have been applied to similar parts.

The difference of the Fig. 6 modification over that of Fig. 5 lies in the provision of different means for intermittently applying the brake 13 for a short time interval following each pulsation of the motor 11. In the present embodiment the actuation of the brake is, as in Fig. 5, controlled by a relay B and the motor relay F operates contacts F2 and F3 in the manner described above. However, to control the duration of time relay B remains energized and, hence, the interval in which brake 13 remains on, and R-C circuit is provided.

When relay F picks up and closes contacts F2, a capacitor C is charged by current supplied from rectifiers RR and a current limiting resistor Re. It will be apparent that when relay F picks up, the contacts F3 are opened and the circuit through relay B thereby broken, preventing its actuation. During the period of the pulse when motor 11 is in operation, the condenser C is being charged. When relay F drops out, contacts F2 open and charging of the condenser C is interrupted. The dropping out of relay F closes contacts F3 completing a circuit connecting condenser C and relay B in series. This causes the charged condenser C to discharge through relay B, thereby energizing that relay and applying the brake 13 in the manner discussed above.

In order to control the length of time the charged condenser C will energize relay B, an adjustable resistance AR is provided. It can be seen that when the relay B picks up, it closes contacts B2, thereby connecting the resistance AR in parallel to the relay. The discharging current can then pass through both the coil of relay B and the resistance AR, causing the voltage across the capacitor to decay more rapidly. By adjusting AR to provide a high resistance in the circuit, the time required for the voltage across the capacitor C to decay to drop-out level for the relay B may be made relatively long. By adjusting AR so that it provides little resistance, the condenser C discharges faster, so that the relay B drops out after a shorter time interval.

In summary, it can be seen that each time the pulsating action given motor 11 is initiated, the condenser C is allowed to charge. When the pulsation is ended, the charge stored by condenser C is allowed to apply a brake 13 for a predetermined time interval. By adjusting resistance AR, the rate of discharge of the capacitor is increased or decreased, and the time interval during which relay B is energized can thus be decreased or increased.

As was true of the second modification described above in connection with Fig. 5, the modification shown in Fig. 6 also provides means for applying the brake 13 each time the Spindle Stop button is pressed to stop the motor 11. In the present case it can be seen that when either relay F or R is picked up and sealed in to operate motor 11, one set of the contacts F2 or R2 will be closed and thus the condenser C will be charging. When either of the Stop buttons is pressed, and the relay F or R drops out, both of the contacts F3 and R3 will be closed and the condenser C will discharge to actuate the brake 13 in the manner described above.

We claim as our invention:

1. In a machine having a plurality of shiftable, inter-engaging elements in a multiple-speed transmission driven by a motor, the combination comprising, means for shifting said transmission elements to any one of a plurality of predetermined positional patterns, power means for actuating said shifting means in response to adjustment of a control member, means for intermittently pulsing the motor a plurality of times to step said elements so that they properly engage when being shifted to a new positional pattern, and means responsive to the energization of said power means for initiating operation of said pulsing means, whereby the inter-engaging elements engage properly even if they are shifted immediately upon energization of said power means due to adjustment of the control member while the power means was de-energized.

2. In a machine having a plurality of shiftable, inter-engaging elements in a multiple-speed transmission driven by a motor, the combination comprising, means for shifting said transmission elements to any one of a plurality of predetermined positional patterns, power means for actuating said shifting means in response to adjustment of a control member, means for intermittently and repeatedly pulsing the motor to step said elements so that they properly engage when being shifted to a new positional pattern, means responsive to the energization of said power means for initiating operation of said pulsing means, and means for terminating operation of said pulsing means after a predetermined time interval so that the inter-engaging elements properly engage when they are shifted immediately upon energization of said power means due to an adjustment of the control member while the power means was de-energized.

3. For use with an electric motor drivingly connected to a multiple ratio transmission having a plurality of elements selectively shiftable to a plurality of positional patterns of inter-engagement and means to shift said elements to any one of said positional patterns in response to a movement of a control member to a corresponding one of a plurality of positions, a control system comprising, in combination, a first circuit for energizing said motor, a control relay and means for actuating the same in response to movement of said control member, means responsive to actuation of said relay for breaking said first circuit and thus de-energizing said motor, a second circuit including two time delay relays interconnected to alternately pick up and drop out after predetermined timed periods, means for completing said second circuit when said control relay is actuated, and a third circuit including means for energizing said motor when one of said time delay relays is energized, so that said transmission elements are rotatively stepped to assure smooth engagement thereof whenever they are shifted to change the ratio of a transmission.

4. For use with an electric motor drivingly connected to a multiple ratio transmission having a plurality of elements selectively shiftable to a plurality of positional patterns of inter-engagement and means to shift said elements to any one of said positional patterns in response to a movement of a control member to a corresponding one of a plurality of positions, a control system comprising, in combination, a first circuit for energizing said motor, a control relay and means for actuating the same for a limited time interval in response to movement of said control member, means responsive to actuation of said relay for breaking first said circuit and thus de-energizing said motor, a second circuit including two time delay relays interconnected to alternately pickup and drop out after predetermined timed periods, means for completing said second circuit when said control relay is actuated, and a third circuit including means for energizing said motor when one of said time delay relays is energized, so that said transmission elements are rotatively stepped during said limited time interval to assure smooth engagement thereof whenever they are shifted to change the ratio of a transmission.

5. For use with an electric motor drivingly connected to a multiple ratio transmission having a plurality of elements selectively shiftable to a plurality of positional patterns of inter-engagement and means to shift said elements to any one of said positional patterns in response to the movement of a control member to a corresponding one of a plurality of positions, a control system for stepping the transmission elements as they are being shifted comprising, in combination, a circuit including two time delay relays interconnected to alternately pick up and drop out after predetermined time periods, and means for energizing said motor when one of said time delay relays is energized.

6. For use with an electric motor in driving engagement with a multiple ratio transmission having a plurality of elements selectively shiftable to a plurality of positional patterns of inter-engagement and means to shift said elements to any one of said positional patterns in response to the movement of a control member to a corresponding one of a plurality of positions, a control system comprising, in combination, a first circuit including a time delayed drop-out relay, a second circuit including a time delay pick-up relay connected in parallel to said first circuit, means for completing said first circuit only when said time delayed pick-up relay is energized, means for breaking said second circuit only when said time delayed drop-out relay is energized, means for energizing said motor when said time delayed drop-out relay is energized, so that said transmission elements can be rotatably stepped to assure smooth engagement thereof whenever they are shifted to change the ratio of the transmission.

7. For use with an electric motor in driving engagement with a multiple ratio transmission having a plurality of elements shiftable into various positional patterns of inter-engagement and means to shift said elements to any one of said positional patterns in response to adjustment of a movable control member to a corresponding position, said means including a power device which must be energized before said elements can be shifted, a control system comprising, in combination, a first circuit for energizing said motor, means to initiate energization of said device and complete said first circuit after a predetermined time interval following said initiation, a control relay and means for actuating the same during said time interval, a second circuit including two time delay relays interconnected to alternately pick up and drop out after respective predetermined time periods, means for completing said second circuit when said control relay is actuated, and means for energizing said motor when one of said time delay relays is energized so that said transmission elements are rotatably stepped to assure smooth engagement thereof when said power device is energized even though the control member has been adjusted while the power device was de-energized.

8. For use with an electric motor in driving engagement with a multiple ratio transmission having a plurality of elements shiftable into various positional patterns of inter-engagement for driving a shaft at varying speeds and means to shift said elements to any one of said positional patterns including a device which should be in operation before said motor is energized, said motor and transmission having a brake effective to resist rotation of said shaft, a control system comprising, in combination, a first circuit for energizing said motor, means to initiate operation of said device and complete said first circuit after a predetermined time interval following said initiation, a control relay and means for actuating the same during said time interval, a second circuit including two time delay relays interconnected to alternately pick up and drop out after predetermined time periods, means for completing said second circuit when said control relay is actuated, means for energizing said motor when one of said time delay relays is energized, and means for activating said brake during those time intervals when said control relay is actuated and the motor is de-energized so that said transmission elements can be rotatably stepped to assure smooth engagement thereof when they are shifted to change the ratio of the transmission.

9. For use with an electric motor in driving engagement with a multiple ratio transmission, having a plurality of elements shiftable to various positional patterns of inter-engagement and means to shift said elements to any one of said positional patterns in response to the movement of a control member to a corresponding position, said motor and transmission having a brake effective to resist rotation of said motor, a control system comprising, in combination, a first circuit for energizing said motor, a control relay and means for actuating the same in response to the movement of said control member, means responsive to actuation of said relay for breaking said first circuit and thus de-energizing said motor, a second circuit including two time delay relays interconnected to alternately pick up and drop out after predetermined time periods, means for completing said second circuit when said control relay is actuated, means for energizing said motor when one of said time delayed relays is energized, and means for activating said brake during those time intervals when said control relay is actuated and the motor is de-energized so that said transmission elements are successively stepped and braked to assure smooth engagement thereof whenever they are shifted to change the ratio of the transmission.

10. For use with an electric motor in driving engagement with a multiple ratio transmission having a plurality of elements shiftable to various positional patterns of inter-engagement for driving a shaft at varying speeds and means to shift said elements to any one of said positional patterns in response to the movement of a control member to a corresponding position, said motor and transmission having a brake effective to resist rotation of said shaft, a control system comprising, in combination, a first circuit for energizing said motor, a control relay and means for actuating the same for a limited time interval in response to the movement of said control member, means responsive to actuation of said relay for breaking said first circuit and thus de-energizing said motor, a second circuit including two time delay relays interconnected to alternately pick up and drop out after predetermined time periods, means for completing said second circuit when said control relay is actuated, means for energizing said motor when one of said time delayed relays is energized, and means for activating said brake during those time intervals when said control relay is actuated and the motor is de-energized so that said transmission elements are successively stepped and braked during said limited time interval to assure smooth engagement thereof whenever they are shifted to change the ratio of the transmission.

11. For use with an electric motor in driving engagement with a multiple-ratio transmission having a plurality of elements shiftable to various positional patterns of inter-engagement for driving a shaft at varying speeds and means to shift said elements to any one of said positional patterns, said motor and transmission having a brake effective to resist rotation of said shaft, a control system comprising, in combination, a circuit including two time delay relays interconnected to alternately pick up and drop out after predetermined time periods, means for energizing said motor when one of said time delay relays is energized, and means for activating said brake during those time intervals when said last named means is not effective to energize said motor, so that said transmission elements can be successively stepped and braked to assure smooth engagement thereof whenever they are shifted to change the ratio of the transmission.

12. For use with an electric motor in driving engagement with a multiple ratio transmission having a plurality of elements shiftable into various positional patterns of engagement and hydraulic means to shift said elements to any one of said positional patterns in response to the movement of a control member to a corresponding position, said hydraulic means including a fluid pump which supplies power to said hydraulic means, a control system comprising, in combination, a first circuit for energizing said motor, a timing device and means to actuate the same for a fixed predetermined period in response to starting the operation of said pump or to positioning said control member, a control relay and means for actuating the same in response to and during the period of actuation of said timing device, means responsive to actuation of said control relay for breaking said first circuit and thus preventing energization of said motor, a second circuit including two time delay relays interconnected to alternately pick up and drop out after predetermined time intervals, means for completing said second circuit when said control relay is actuated, and means for energizing said motor when one of said time delay relays is energized, so that said transmission elements are rotatably stepped a predetermined number of times to insure smooth engagement thereof whenever they are hydraulically shifted to change the ratio of the transmission.

13. In a machine having a plurality of shiftable, interengaging elements in a multiple-speed transmission driven by a motor and driving a shaft, the combination comprising, a releasable brake adapted when actuated to resist rotation of said shaft, a movable control member and means for shifting said elements to any one of a plurality of predetermined positional patterns in response to movement of the control member to a corresponding one of a plurality of positions, means for intermittently pulsing the motor and releasing said brake to step said elements so that they properly engage, means for applying the brake immediately following each motor pulsation, and means responsive to movement of said control member for initiating operation of said pulsing means and brake.

14. In a machine having a plurality of shiftable, interengaging elements in a multiple-speed transmission driven by a motor and driving a shaft, the combination comprising, a brake actuatable to resist rotation of said shaft, means for shifting said transmission elements to any one of a plurality of predetermined positional patterns, a device which is actuated to supply power to said shifting means, means for intermittently pulsing the motor while releasing said brake to step said elements so that they properly engage when being shifted to a new positional pattern, means for activating said brake immediately following each pulsation of said motor, and means responsive to the actuation of said device for initiating operation of said pulsing means and brake so that whenever power is first supplied to the shifting means the motor will be pulsed, thereby insuring proper engagement of the shiftable elements when the shifting means has been conditioned for operation while said device was not actuated.

15. In a machine having a plurality of shiftable, interengaging elements in a multiple-speed transmission driven by a motor, the combination comprising, means including a control for shifting said transmission elements to any one of a plurality of predetermined positional patterns, a device which, when operating, supplies power to said shifting means in response to setting of said control, means for intermittently pulsing the motor a plurality of times to step said elements so that they properly engage when being shifted to a new positional pattern, and means responsive to starting the operation of said device for initiating operation of said pulsing means so that whenever power is first supplied to the shifting means regardless of the setting of said control the motor will be pulsed, thereby insuring proper engagement of the shiftable elements when the control has been reset while said device was not in operation.

16. In a machine having a plurality of shiftable, interengaging elements in a multiple-speed transmission driven by a motor, the combination comprising, means including a control for shifting said transmission elements to any one of a plurality of predetermined positional patterns, a device which, when operating, supplies power to said shifting means in response to the setting of said control, means for intermittently pulsing the motor a plurality of times to step said elements so that they properly engage when being shifted to a new positional pattern, and means responsive to starting the operation of said device for initiating operation of said pulsing means, and means for terminating the operation of said pulsing means after a predetermined time interval so that whenever power is first supplied to the shifting means regardless of the setting of said control the motor will be pulsed, thereby insuring proper engagement of the shiftable elements when the control has been reset while said device was not in operation.

References Cited in the file of this patent

UNITED STATES PATENTS

| | | |
|---|---|---|
| 1,588,004 | Blood | June 8, 1926 |
| 2,110,173 | Pohl et al. | Mar. 8, 1938 |
| 2,164,884 | Nenninger et al. | July 4, 1939 |
| 2,167,790 | Whitehead et al. | Aug. 1, 1939 |
| 2,529,067 | Bennett et al. | Nov. 7, 1950 |
| 2,557,324 | Tomlinson | June 19, 1951 |
| 2,782,651 | Sassen et al. | Feb. 26, 1957 |
| 2,782,891 | Sassen | Feb. 26, 1957 |